United States Patent
McKitrick et al.

[11] Patent Number: 5,905,229
[45] Date of Patent: May 18, 1999

[54] MODULAR PANEL PARTITION SYSTEM

[76] Inventors: Mark A. McKitrick, 7357 Expressway Ct. S.W., Caledonia, Mich. 49316; David V. Middleton, 1365 Yankee Springs Rd., Middleville, Mich. 49333

[21] Appl. No.: 08/815,209

[22] Filed: Mar. 12, 1997

Related U.S. Application Data

[60] Provisional application No. 60/013,414, Mar. 14, 1996.

[51] Int. Cl.$^6$ ....................................................... H02G 3/10
[52] U.S. Cl. ......................... 174/48; 52/220.7; 52/238.1; 52/239
[58] Field of Search .................. 174/48, 49; 52/220.2, 52/220.7, 239, 238.1

[56] References Cited

U.S. PATENT DOCUMENTS

| | | | |
|---|---|---|---|
| 2,187,408 | 1/1940 | Thumm | 52/220.7 |
| 2,321,568 | 6/1943 | Wilson | 174/49 |
| 2,882,564 | 4/1959 | Couse et al. . | |
| 2,934,180 | 4/1960 | Hammitt et al. | 52/220.7 X |
| 3,327,440 | 6/1967 | Watkins . | |
| 3,349,535 | 10/1967 | Balinski | 52/220.2 X |
| 3,430,997 | 3/1969 | Propst et al. . | |
| 3,517,467 | 6/1970 | Propst et al. . | |
| 3,640,039 | 2/1972 | McKee et al. . | |
| 3,696,855 | 10/1972 | Kira . | |
| 3,705,471 | 12/1972 | Allen . | |
| 4,185,422 | 1/1980 | Radek | 52/239 X |
| 4,231,630 | 11/1980 | Propst et al. . | |
| 4,277,123 | 7/1981 | Haworth et al. . | |
| 4,344,475 | 8/1982 | Frey . | |
| 4,458,461 | 7/1984 | Holley . | |
| 4,493,172 | 1/1985 | Jones . | |
| 4,703,985 | 11/1987 | Finkbeiner et al. . | |
| 4,716,698 | 1/1988 | Wilson et al. . | |
| 4,719,730 | 1/1988 | Winkowski | 52/238.1 |
| 4,899,018 | 2/1990 | Sireci . | |
| 4,918,886 | 4/1990 | Benoit et al. . | |
| 4,953,333 | 9/1990 | Carlson . | |
| 5,033,526 | 7/1991 | DeLong et al. | 52/239 X |
| 5,065,556 | 11/1991 | DeLong et al. . | |
| 5,091,607 | 2/1992 | Stob . | |
| 5,092,385 | 3/1992 | Beauliea . | |
| 5,097,643 | 3/1992 | Wittler | 52/239 X |
| 5,195,287 | 3/1993 | Bruggink . | |
| 5,207,037 | 5/1993 | Giles et al. | 52/239 X |
| 5,219,406 | 6/1993 | Raz . | |
| 5,274,970 | 1/1994 | Roberts . | |
| 5,377,466 | 1/1995 | Insalaco et al. . | |
| 5,381,994 | 1/1995 | Welch . | |

FOREIGN PATENT DOCUMENTS

| | | | |
|---|---|---|---|
| 963880 | 3/1975 | Canada | 52/220.7 X |

Primary Examiner—Dean A. Reichard

[57] ABSTRACT

A modular panel partition system has a number of partition panels, each with opposing top and bottom edges, with opposing side edges that are adapted to releasably couple with a panel connector, and with an upper portion and an adjoining lower portion that extends between the upper portion and the bottom edge to define a wire-way. The panel connector has an elongated one-piece body that defines a post, has at least two sides that are adapted to releasably couple with a side edge of a panel to couple adjacent panels, and has an aperture that extends through the at least two sides of the panel connector. The aperture is aligned with the wire-ways of the panels and is adapted to pass conduits between the panels. The one-piece post extends from the bottom edge to the top edge of the panels. The aperture in the panel connector may extend through a bottom end of the panel connector. The panel connector post may also be hollow and adapted to pass conduits through the hollow portion. The wire-way includes a perimeter picture frame with opposing top and bottom plates and opposing Z-shaped end supports. The end supports have a web portion between two flanges, and the web portion is aligned within about 45 degrees of a center line that extends between the opposing side edges of the panel. Elongated support glides extend from the panel upper portion to beyond the bottom edge to support the panel upon a supporting floor, with the picture frame hanging generally downward from the upper portion to the bottom edge, without providing generally vertical structural support of the panel. The wire-way has a cover with an access opening and a slide cover that slides between a closed position to overlay and close the opening and an open position to provide access through the opening.

14 Claims, 3 Drawing Sheets

MODULAR PANEL PARTITION SYSTEM

CROSS-REFERENCES TO RELATED APPLICATIONS

This is a continuation in part application of co-pending, provisional U.S. patent application Ser. No. 60/013,414, entitled MODULAR PARTITION SYSTEM and filed on Mar. 14, 1996 by M. McKitrick and D. Middleton, the disclosure of which is incorporated here by reference.

BACKGROUND OF THE INVENTION

The invention relates to panel partition systems that are commonly used in office environments and the like.

Many common panel partition systems that are used in office environments include a number of partition panels that are arranged to define various work stations. When the panels are placed in position, a panel connector will typically be interposed between a side edge of one panel and a side edge of an adjacent panel, to couple two adjacent panels together. These panels are also typically provided with a wire-way within the panel to provide communication and power connections at the work space. The wire-way is often positioned along the bottom edge of the panels. Thus, the connector between the panels typically extends between the top of the wire-way and, the top of the panels, so the connector will not block or obstruct the wire-way passage between the panels. Because of this common arrangement, additional cover pieces are required to enclose the wire passage space that is defined below the panel connector and between the panels, where wiring and the like extend between the wire-ways of adjacent panels. These cover pieces are small to cover the small gap between the adjacent panel wire-ways, and typically do not conveniently fit tightly and securely. Rather, the small covers often become displaced or broken, as is the nature of small parts. Thus, because of the use of these small covers, the visual impression presented at the floor level of commonly known panel partition systems is a patchy or broken up appearance of a small cover filling a gap between larger, adjacent covers.

Another feature of commonly known panel partition systems is the use of "knockout" panels along wire-way covers to provide an access opening through the cover to the wiring or other conduits that extend through the wire-way. These have proven fairly successful for initial setup and installation of commonly known panel partition systems. The knock-out wire-way access does not lend itself to reconfiguration, however. Once the knock-out portion of the wire-way cover is removed, there is no provision for replacing it. Thus, if a power or communication jack, for example, is relocated, then either a dead jack or other plug must be left in the original location, or an unsightly potentially hazardous hole is left in the wire-way cover.

Finally, the common practice of placing the wire-way along the bottom edge of the partition panel provides a structural challenge in terms of providing standing strength to support the panel above, and in terms of maximizing the passageway available for wiring and the like. Most significantly, providing adequate bending strength has traditionally been provided by narrowing the width of the wire-way passage to provide a required width of a structural member, thereby restricting the size of wiring or conduit that will pass through the wire-way.

BRIEF SUMMARY OF THE INVENTION

A modular panel partition system according to the invention addresses several failings of previously known partition panels, including those failings that are identified above, with a panel partition system that has a first panel and a second panel, each panel having opposing first and second edges that are adapted to releasably couple with a panel connector. Each panel extends from a bottom edge to an opposing top edge and has an upper portion and an adjoining lower portion that extends between the upper portion and the bottom edge to define a wire-way to pass conduits into and through the panels. The panel connector has an elongated one-piece body that defines a post, has a first side that is adapted to releasably couple with an edge of a panel, has a second side that is adapted to releasably couple with an edge of a panel, and has an aperture that extends through each of the first and second sides of the panel connector. The aperture is positioned on the panel connector to align with the wire-way and is adapted to pass conduits through the aperture, between the panels. The panel connector is interposed in abutting engagement between the adjoining edges of two adjacent panels to connect the adjacent panels. The one piece post extends from the bottom edge of the panels to the top edge of the panels.

In other aspects of the invention, the panel connector has a bottom end at the bottom edge of the panels and the aperture may extend through the bottom end. The panel connector may have a third or more sides to connect three or more adjacent panels. Further, the post may be hollow and adapted to pass conduits through the hollow portion.

In another aspect of the invention, the wire-way includes a perimeter picture frame with a top plate and an opposing bottom plate, the top and bottom plates extending generally between the side edges of the panel with the bottom plate being located at the bottom edge. Two Z-shaped end supports extend between the top and bottom plates. One of the end supports is located near one of the side edges and the other end support is located near the other side edge. Further, each Z-shaped end support may have a web portion with two opposing edges, may have a first flange at one of the edges, that is generally perpendicular to the web and extends in a first direction, and may have a second flange at the other web edge, that is generally perpendicular to the web and extends in a second direction that is generally opposite to the first direction. Also, the web may be aligned within about forty-five degrees of a center line that extends between the two side edges of the panel. The picture frame top plate is connected to the panel upper portion and the picture frame hangs generally downward from the upper portion to the bottom edge.

In yet another aspect of the invention, each panel includes two support glides that are connected with the upper portion and extend beyond the bottom edge to support the panel above a supporting floor. One of the support glides is located near one of the panel edges and the other support glide is located near the other panel edge. The support glides extend from the upper portion to beyond the bottom edge, so the panel stands upon the glides, with the picture frame hanging generally downward from the upper portion, without providing generally vertical structural support of the upper portion.

Each wire-way has a cover panel that extends between the upper portion and the bottom edge and between the two side edges of the panel. The cover panel has an interior surface and an opening that extends through the cover panel to provide access and connection with conduits that may pass through the wire-way. The cover panel also has a sliding cover that abuts the inner surface and slides between a closed position in which the slide cover overlays and closes the opening, and an open position in which the slide cover does not obstruct the opening.

These and other features, objects, and benefits of the invention will be recognized by one having ordinary skill in the art and by those who practice the invention, from the specification, the claims, and the drawing figures.

DETAILED DESCRIPTION OF THE INVENTION

Figure 1:
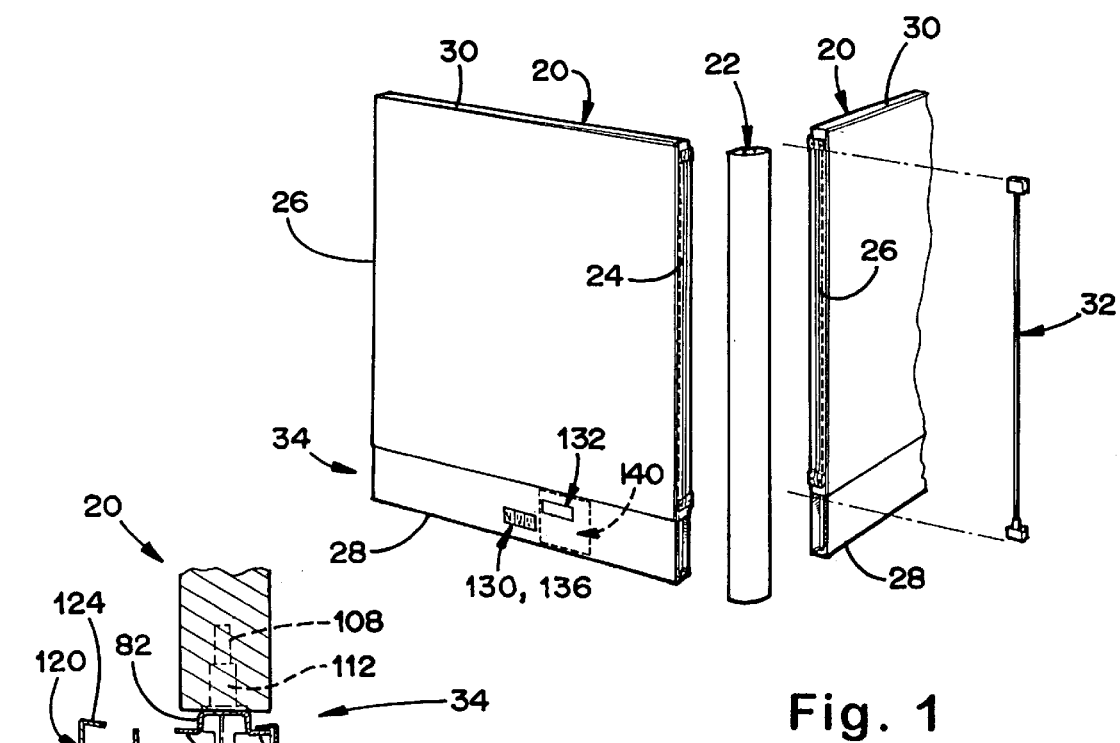
FIG. 1 is an exploded perspective view of a connection between two adjoining panels of a modular partition system according to the invention.

A modular panel partition system according to the invention includes a plurality of partition panels 20 (FIG. 1) that are interconnected with a plurality of panel connecting posts 22. Each panel 20 has a first side edge 24, an opposing second side edge 26, a bottom edge 28 and an opposing top edge 30. The modular partition system is assembled by positioning a first partition panel 20 and an adjacent, second partition panel 20 and interconnecting the first side edge 24 of the first panel 20 and the second side edge 26 of the second panel 20 with a connecting post 22. Each of the first edge 24 of the first panel 20 and the second edge 26 of the second panel 20 may be connected with the panel connecting post 22 by conventionally known methods, including, but not limited to, the use of a tiebar 32 as is disclosed in U.S. Pat. No. 3,430,997, entitled Panel Joint and issued on Mar. 4, 1969, to R. L. Propst, et al., now expired.

Figure 6:
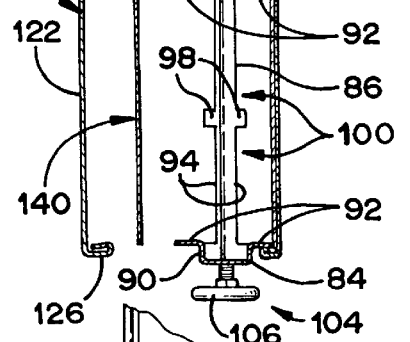
FIG. 6 is a fragmentary, partially exploded, cross-sectional view of a lower portion of a partition panel of FIG. 1.
Figure 7:
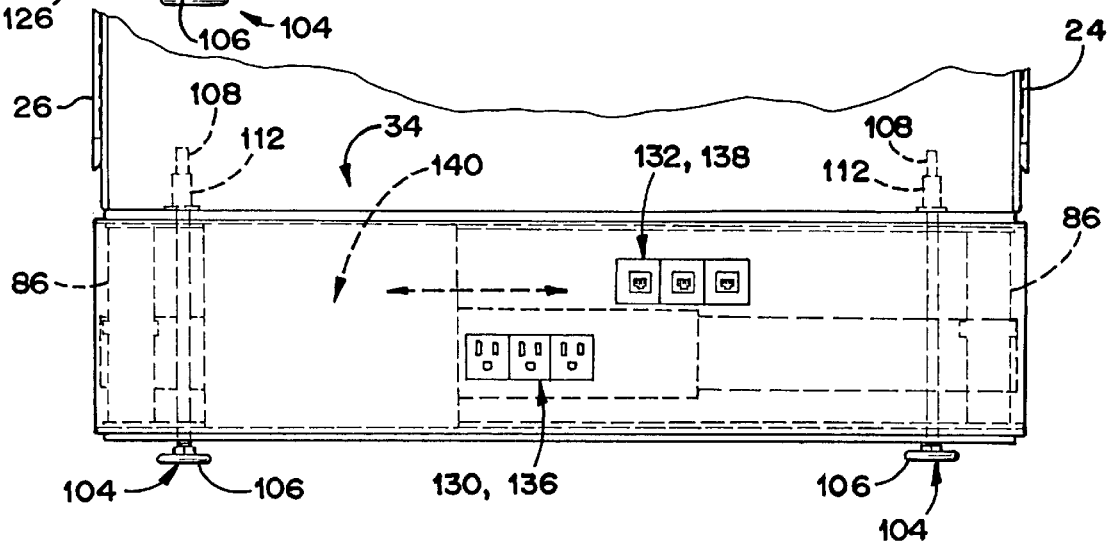
FIG. 7 is a fragmentary, side-elevational view of the lower portion of the panel of FIG. 6.

For user convenience, each partition panel 20 includes a lower portion 34 that is adjacent the bottom edge 28 and that defines a wire-way to pass conduits into and through the partition panel 20 (FIGS. 1, 6 and 7). The conduits may include wiring and fiber optics for communication and data transfer, electrical power wiring, and other cabling, for example. The conduits may also include such items as hydraulic and pneumatic piping or hoses, for example.

The connecting post 22 is sized in length to extend from about the bottom edge 28 of the panels 20 to the top edge 30 (FIG. 1). The connecting post 22 is, therefore, provided with a conduit passage 38 (FIG. 2) through the connecting post, at a bottom end 40 of the connecting post, to pass conduits through the post, from one panel 20 to an adjacent panel 20. Previous common practice limits the connector to extend only between the top edge 30 of the panel 20 and the lower portion 34 of the panel 20. Prior known connectors do not extend into the wire-way that is defined by the lower portion 34 of the panel. Thus, the connecting post 22 of the present invention is different from the common practice because, among other features, it extends through the wire-way from about the bottom edge 28 of the partition panel 20, to the top edge 30. Use of the panel connecting post 22 enhances the overall modular partition system by eliminating several wire-way cover components between adjacent partition panels 20, thereby providing a cleaner, more attractive appearance, among other features.

Figure 2:
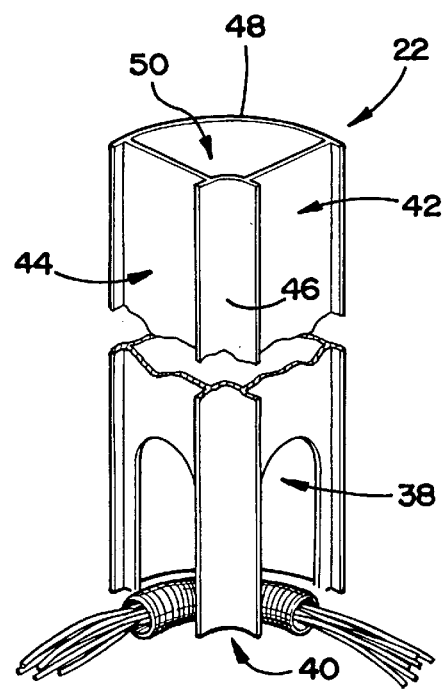
FIG. 2 is a fragmentary perspective view of a corner connector post of FIG. 1.

As shown in the drawing FIGS. 1 and 2, the panel connecting post 22 is a corner post to connect two adjacent partition panels 20 at a corner. Thus, the connecting post 22 is generally trapezoidal shaped in cross section with opposing end walls 42 and 44 to attach to the partition panels 20 as is discussed in greater detail above. The end walls 42 and 44 are interconnected by opposing inner and outer walls 46 and 48, respectively. Also as discussed above, the connecting post 22 extends through the wire-way that is defined in the lower portion 34 of the partition panel 20, and is, therefore, provided with a conduit or wire-way passage 38, through the connecting post at the lower end 40 of the post. For further user convenience, the connecting post 22 may be formed with a passage 50 that extends along the length of the post and is adapted to have conduits extend through the passage 50.

The panel connecting post 22 may be made of any suitable construction and most preferably comprises a one piece, extruded member. The post 22 may also be formed of any suitable material, including, plastics, wood, and metal for example. Most preferably, panel connecting post 22 is formed as an aluminum alloy extrusion with 6063-T5 aluminum. This construction has been found to provide desirable user and production qualities in an extruded panel connecting post 22. More particularly, when using this construction, the opposing end walls 42 and 44 may be made with an about 0.062 inch (1.5 mm) thickness and a width between the inner and outer walls that corresponds to the thickness of the associated partition panels 20 (typically on the order of about 1.75 inches or 4.44 mm). The inner wall 46 may also be formed with a thickness of about 0.062 inches (1.6 mm), with an about 0.375 inch (9.5 mm) interior radius of arc and edge flanges extending about 0.25 inches beyond the opposing end walls 42 and 44. The outer wall 48 may also be made with a thickness of about 0.062 inches (1.6 mm) and a 2.25 inch (57.1 mm) interior radius of arc.

Of course, not all the joints or connections between adjacent partition panels 20 will be in the form of a corner between two panels. Thus, alternative configurations of the panel connecting post 22 are desired and may be provided as shown in the drawing FIGS. 3 through 5, for example.

Figure 3:
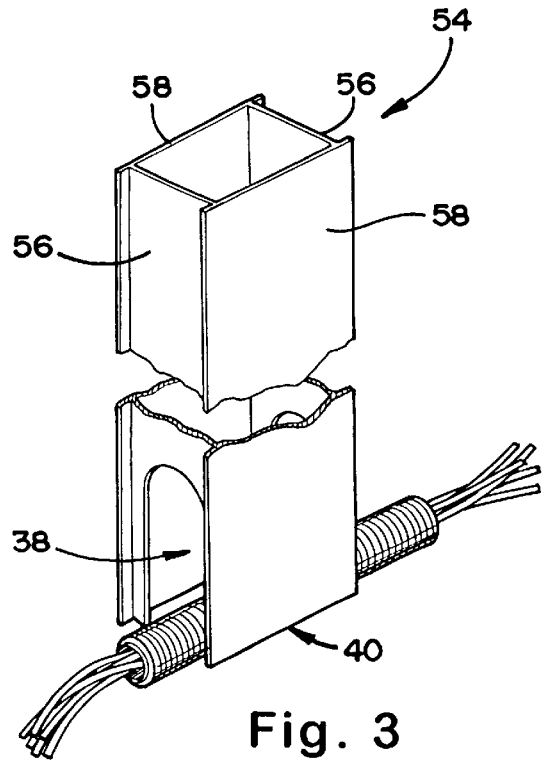
FIG. 3 is a fragmentary perspective view of a first alternative connector post.

A first alternative connecting post 54, shown in FIG. 3, provides an in line connection between two adjacent, generally coplanar partition panels 20. The connecting post 54 has opposing end walls 56 that are interconnected with opposing side walls 58. The connecting post 54 may also be constructed as an extruded aluminum alloy member similar to the panel connecting post 22, discussed in greater detail above.

Figure 4:
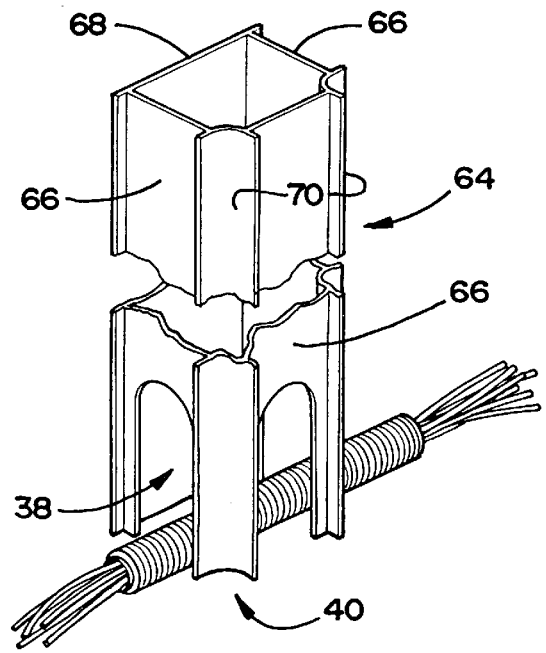
FIG. 4 is a fragmentary perspective view of a second alternative connector post.

A second alternative connecting post 64, shown in FIG. 4, provides a T-shaped connection between three adjacent partition panels 20. The connector post 64 has three end walls 66 that are interconnected with a sidewall 68 and inner walls 70, as shown. The connecting post 64 may also be constructed as an extruded aluminum alloy member similar to the panel connecting post 22 discussed above.

Figure 5:
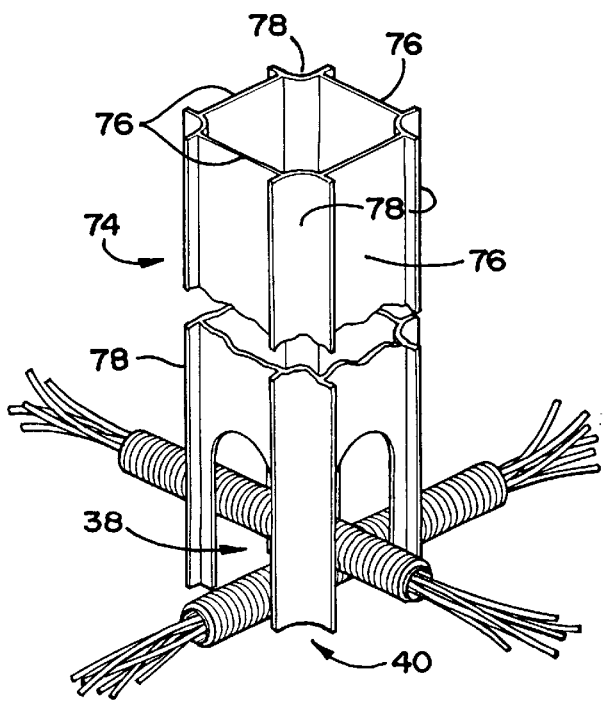
FIG. 5 is a fragmentary perspective view of a third alternative connector post.

A third alternative connecting post 74, shows in FIG. 5, provides for interconnection among four adjacent, generally perpendicular partition panels 20. The connector post 74 has four end walls 76 that are interconnected with curved inner walls 78, as shown. The connecting post 74 may also be constructed as an extruded aluminum alloy member as is discussed above regarding the partition panel connecting posts 22, 54 and 64.

Figure 8:
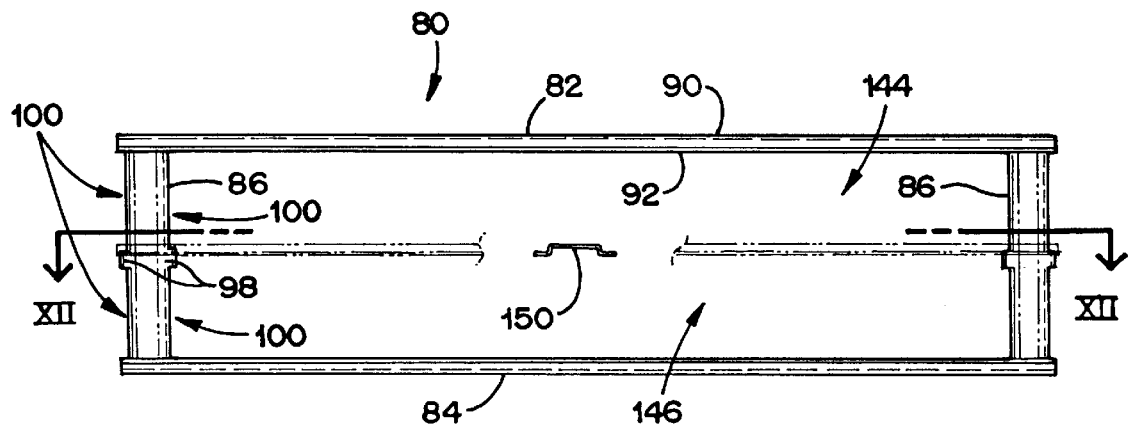
FIG. 8 is a side-elevational view of a wire-way frame assembly of the panel of FIG. 6, showing an optional wire-way partition tray in phantom.

Turning to the partition panels 20 in greater detail, and the drawing FIGS. 6 through 12, each partition panel 20 has a lower portion 34 that defines a wire-way to pass conduits into and through the partition panel 20, as discussed above. More particularly, the wire-way is defined by a wire-way frame 80 that is made up of a top plate 82, a bottom plate 84, and two end supports 86 (FIG. 8). The top and bottom plates 82 and 84 are generally lengths of about 0.06 inch (1.5 mm) thick cold rolled steel hat channel. Thus, in cross section, each of the top and the bottom plates 82 and 84, respectively, has a generally U-shaped center channel or crown portion 90 with outwardly extending brim flanges 92 (FIGS. 6 and 8). The crown 90 is most preferably about 0.805 inches (20.4 mm) wide and about 0.385 inches (9.8 mm) deep. Each brim flange 92 extends about 0.444 inches (11.3 mm) away from the center channel or crown 90. Further, the brim flanges 92 are not square with the crown 90, but are bent at an about eighty-seven degree angle relative to the crown, to capture a cover plate as will be discussed in greater detail below.

Each end support 86 is an about 5.35 inch (135.9 mm) length of 0.045 inch (1.1 mm) thick steel Z-channel (FIGS. 6-12). Thus, the end support 86 is formed with a pair of flanges 94 that extend about 0.615 inches (15.6 mm) in opposite directions from opposing ends of an about 1.2 inch (30.5 mm) deep web portion 96 to provide a conduit passage past the end supports 86 for about 0.625 inch (15.9 mm) diameter conduits, and to provide a support tab 98 for an optional wire-way divider panel (discussed further below). A pair of about 2.225 inch (56.5 mm) by 0.31 inch (7.9 mm) notches 100 are cut into each of the two opposing flanges 94. The notches 100 are spaced about 0.3 inches (7.8 mm) from opposing ends of the end support 86 to leave an about 0.3 inch support tab 98 generally centered along the length of each of the two opposing flanges 94 of the end support 86, between the notches 100.

As can be seen in drawing FIGS. 6 and 8, the top and bottom plates 82 and 84, respectively, are oriented with the open side of the crowns 90 facing one another, and are spaced apart with a pair of end supports 86 seated in the opposing crowns 90. An end support 86 is installed at each of the two opposing ends of the top plate 82 and the bottom plate 84. The end of the end support 86 is seated in the crown 90 of each of the top and bottom plates 82 and 84 respectively. The end support 86 is positioned in the crown 90 by rotating the end support 86 to abut the ends of the flanges 94 against the sides of the U-shaped center channel or crown 90 (FIGS. 9-12). With the end support 86 so positioned, at the end of the respective top plate 82 or bottom plate 84, the end support 86 is welded to the respective top plate or bottom plate.

The assembled wire-way frame 80 is attached at the bottom of the partition panel 20 by screws, rivets or other conventional method, to define the panel lower portion 34 and the wire-way for conduit passage into and through the panel 20 (FIGS. 6 and 7). The panel does not, however, stand on the wire-way frame 80. Rather, the panel 20 stands on adjustable glides 104 that have a broad head 106 and a long, threaded shaft 108. Each of the top plate 82 and bottom plate 84 of the wire-way frame 80 is provided with a glide hole 110 near each of the two end supports 86 (FIGS. 9-12). The glide hole 110 is an elongated or ovoid aperture to minimize potential for transferring lateral forces to the glide 104 by the wire-way frame 80, when the glide is positioned in the glide holes 110.

As just suggested, the glides 104 are inserted into the glide holes 110 and extend through the lower portion 34 of the partition panel 20 as defined by the wire-way frame 80. The glides 104 are received by threaded nuts 112 in the panel 20 (FIG. 6 and 7). Thus, the vertical loads of the panel 20 are transmitted through the nuts 112 and the glides 104 to a floor or the like that the modular partition system stands upon. The wire-way frame 80 is actually suspended and hangs down from the partition panel 20. The wire-way frame 80 does not receive vertical loading.

The sides of the wire-way are closed by cover panels 120 (FIG. 6). The cover panels 120 are channel members made of about 0.045 inch (11.4 mm) thick steel. Each cover panel 120 has a body portion 122 that is about 5 inches (127 mm) high and has a length to match the width of the partition panel 20. The cover panel 120 has two flanges extending along the length of the cover panel 120 at each of two opposing edges of the cover body 122. A double thickness bottom flange 126 is formed by bending an about 0.632 inch (16.1 mm) wide flange portion back upon itself to result in a flange of about 0.4 inches (10.2 mm) wide. The top flange 124 is a single thickness portion that extends about 0.358 inches (9.1 mm) and is bent over to define an angle of about 79.6 degrees between the top flange 124 and the cover body 122.

To provide power and communication access, for example, to a user of the modular partition system, an elongated opening 130 (FIGS. 1 and 7) is generally centered in a lower half of the cover panel 120 and a second opening 132 is positioned adjacent an end of the opening 130 and located generally in an upper half of the cover body 122. This specific arrangement is desirable in providing power and communication access, for example, on opposing sides of the partition panel 20. As seen in drawing FIGS. 1 and 7, an array of power outlets 136 may be positioned in the lower opening 130, while an array of communication outlets 138 may be positioned in the upper opening 132. To conveniently provide power on both sides of the partition panel 20, the array of power outlets 136 may be a symmetrical block that presents an identical array of outlets 136 on each of the two opposing sides of the partition panel 20. Thus, centering the block of outlets along the width of the panel 20 and centering the lower opening 130 allows the use of a single, interchangeable cover panel 120 for each of the two opposing sides of the partition panel 20, rather than having a separate cover panel for each of the two sides of the partition panel 20. Further, the position of the upper opening 132 relative to the lower opening 130 provides an identical presentation of the power and communication outlet arrays on each side of the partition panel 20.

If one or both of the upper opening 132 and lower opening 130 in the cover panel 120 are not used, a slide cover 140 (FIGS. 1, 6 and 7) is provided to overlay and close the respective unused opening or openings. The slide cover 140 is an about 0.035 inch (0.9 mm) thick metal panel having a length to cover at least both of the upper opening 132 and lower opening 130 in the cover panel 120, and a height that is sized to allow the slide cover 140 to slide freely between the top and bottom flanges 124 and 126, respectively, of the cover panel 120. The slide cover 140 is placed against the body portion 122 of the cover panel 120, between the top end bottom flanges 124 and 126, respectively.

With the slide cover 140 positioned in the cover panel 120, the cover panel may be set over the wire-way frame 80 on one or the other side of the partition panel 20 (FIG. 6). The top flange 124 of the cover panel 120 overlays the corresponding brim flange 92 of the top plate 82. The cover panel 120 is pressed downward and inward to lay the bottom flange 126 of the cover panel 120 over the corresponding brim flange 92 of the bottom plate 84, resulting in the respective brim flanges 92 of the top plate 82 and the bottom plate 84 being captured between the top flange 124 and the bottom flange 126 of the cover panel 120. With the cover panel 120 assembled to the wire-way frame 80, as just described, it is noted that the respective brim flanges 92 of the top plate 82 and the bottom plate 84 abut the slide cover 140 and hold the slide cover 140 in sliding engagement against the cover panel body 122. The slide cover 140 may be slid along the cover panel 120 to reveal or conceal the lower opening 130 and upper opening 132, individually or together, depending on whether they are being used or left blank.

In some installations of the modular partition system, it will be desirable to divide the wire-way into an upper wire-way 144 (FIG. 8) and a lower wire-way 146. This may be accomplished with an optional wire-way divider panel 150 (FIGS. 8–11), similar to the top plate 82 and bottom plate 84 of the wire-way frame 80, the divider panel 150 may also be a length of about 0.06 inch (1.5 mm) thick cold rolled steel hat channel, similar to the top plate 82 and bottom plate 84, discussed above. The divider panel 150 is, however, notched at each end to go around the threaded shaft 108 of each support glide 104 and the end supports 86 of the wire-way frame 80. One end of the divider panel 150 has a relatively shallow notch 152 that is sized in length to clear the glide 104 and end support 86 at one end of the wire-way frame 80. The opposing end of the divider panel 150 is provided with a longer notch 154 that is about twice as long as the notch 152 at the other end of the divider 150. The longer notch 154 is sized to facilitate installation and removal of the divider panel 150.

Figure 9:
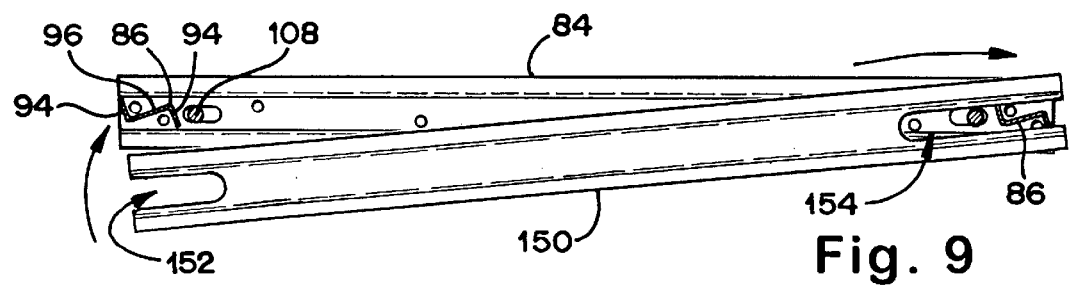
FIG. 9 is a cross-sectional view along line XII—XII of FIG. 8, showing the partition tray in a first installation position.
Figure 10:
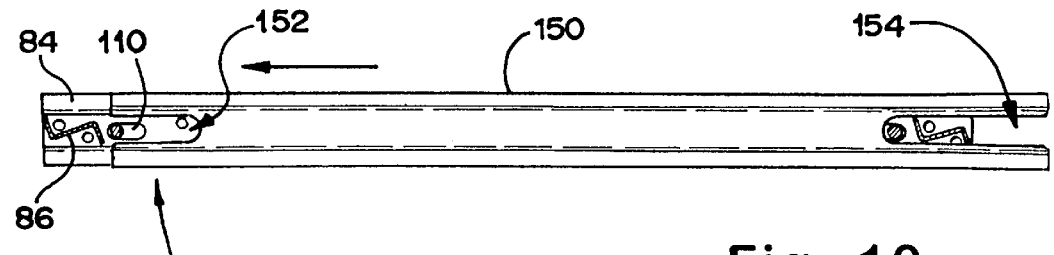
FIG. 10 is the view of FIG. 9, showing the partition tray in a second installation position.
Figure 11:
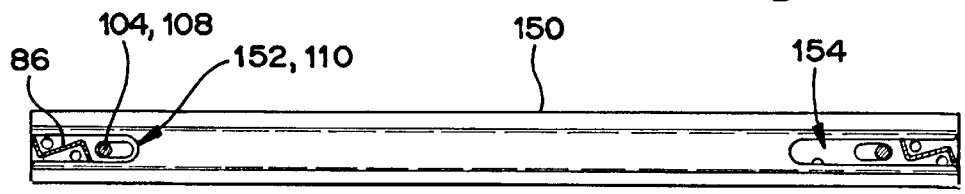
FIG. 11 is the view of FIG. 9, showing the partition tray in an installed position.
Figure 12:
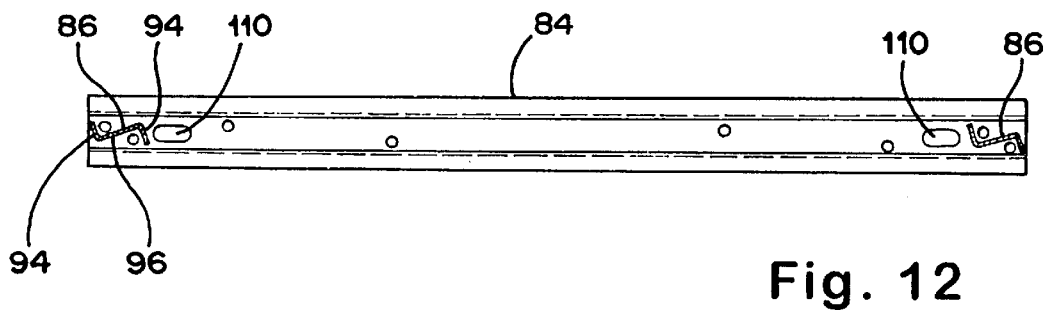
FIG. 12 is the view of FIG. 9 with the optional partition tray omitted.

To install the optional wire-way divider panel 150, a cover panel 120 is removed from one side of the wire-way frame 80. The longer notch 154 of the divider panel 150 is placed around the glide 104 and end support 86 at one end of the wire-way frame 80 (FIG. 9). The divider panel is slid around the glide 104 and end support 86 until the shaft 108 of the glide 104 is seated in the bottom of the notch 154, so the opposing end of the divider panel 150 can swing past the shaft 108 of the glide 104 at the opposite end of the wire-way frame 80 (FIG. 10). The divider panel 150 is then aligned with the wire-way frame 80 by sliding the divider panel to seat the glide 104 and end support 86 in the short notch 152 (FIG. 11). The cover panel 120 may be reinstalled as discussed in greater detail above. The removal of the optional wire-way divider panel 150 is substantially the reverse of the process of installation, just described.

It will be understood by one having ordinary skill in the art and by those who practice the invention, that various modifications and improvements may be made without departing from the spirit of the disclosed concept. The scope of protection afforded is to be determined by the claims and by the breadth of interpretation allowed by law.

I claim:
1. A modular panel partition system comprising:
a first panel and a second panel, each of the first and the second panels having a first edge and an opposing second edge, each of the first and the second edges being adapted to releasably couple with a panel connector, each of the first and the second panels extending from a bottom edge to an opposing top edge, each of the first and the second panels having an upper portion and an adjoining lower portion that is adjacent the bottom edge, the lower portion defining a wire-way to pass conduits into and through the panels, the wire-way including a perimeter frame, with a top plate and an opposing bottom plate, the top and the bottom plates extending generally between the first and the second side edges, the bottom plate being located at the bottom edge, and with two Z-shaped end supports that extend between the top and the bottom plates, one of the end supports being located near the first side edge, the other of the end supports being located near the second side edge; and
a panel connector, the panel connector having an elongated one piece body that defines a post, having a first side that is adapted to releasably couple with either of the first edge or the opposing second edge of one of the panels, having a second side that is adapted to releasably couple with either of the first edge or the opposing second edge of the other of the panels, and having an aperture that extends through each of the first and second sides of the panel connector, the aperture being aligned with the wire-way and being adapted to pass conduits through the aperture, between the panels, the panel connector being interposed between the first edge of the first panel and the second edge of the second panel in abutting engagement to connect the first and the second panels, the one piece post extending from the bottom edge of the first and second panels to the top edge of the first and second panels.

2. The modular panel partition system of claim 1, wherein each Z-shaped end support has a web portion with two opposing web edges, has a first flange that is generally perpendicular to the web and extends in a first direction from one of the two opposing web edges to a terminal end, and has a second flange that is generally perpendicular to the web and extends in a second direction that is generally opposite to the first direction, from the other of the two opposing web edges to a terminal end, and wherein the web is oriented to define an acute angle between the web and a centerline reference plane that extends between the panel first side edge and opposing second side edge.

3. The modular panel partition system of claim 1, wherein the perimeter frame top plate is connected to the panel upper portion and the perimeter frame hangs generally downward from the upper portion to the bottom edge.

4. The modular panel partition system of claim 3, wherein each of the first and the second panels further includes two support glides that are connected with the upper portion to support the panel above a supporting floor, one of the support glides being located near the first edge, the other of the support glides being located near the second edge, wherein the support glides extend from the upper portion to beyond the bottom edge, and wherein the perimeter frame does not provide generally vertical structural support of the upper portion.

5. A modular panel partition system comprising a number of partition panels, each panel having:
a first side edge and an opposing second side edge, each of the first and the second side edges being adapted to releasably couple with a panel connector to releasably connect the panel with a second, adjacent panel;

a bottom edge and an opposing top edge;

an upper portion that extends from the top edge, toward the bottom edge; and a lower portion that extends between the upper portion and the bottom edge, the lower portion defining a wire-way that is adapted to pass conduits into and through the panel, the wire-way having a perimeter frame, with a top plate and an opposing bottom plate, the top and the bottom plates extending generally between the first and the second side edges, the bottom plate being located at the bottom edge, and with two Z-shaped end supports that extend between the top and the bottom plates, one of the end supports being located near the first side edge, the other of the end supports being located near the second side edge.

6. The modular panel partition system of claim 5, wherein each Z-shaped end support has a web portion with two opposing web edges, has a first flange that is generally perpendicular to the web and extends in a first direction from one of the two opposing web edges to a terminal end, and has a second flange that is generally perpendicular to the web and extends in a second direction that is generally opposite to the first direction, from the other of the two opposing web edges to a terminal end, and wherein the web is oriented to define an acute angle between the web and a centerline reference plane that extends between the panel first side edge and opposing second side edge.

7. The modular panel partition system of claim 5, wherein each wire-way has a cover panel that extends between the upper portion and the bottom edge and between the first and the second edges, the cover panel having an inner surface, having an opening therethrough, and having a slide cover that abuts the inner surface and slides between a closed position in which the slide cover overlays and closes the opening, and an open position in which the slide cover does not obstruct the opening.

8. The modular panel partition system of claim 5, wherein the perimeter frame top plate is connected to the panel upper portion and the perimeter frame hangs generally downward from the upper portion to the bottom edge.

9. The modular panel partition system of claim 8, wherein each of the first and the second panels further includes two support glides that are connected with the upper portion to support the panel above a supporting floor, one of the support glides being located near the first edge, the other of the support glides being located near the second edge, wherein the support glides extend from the upper portion to beyond the bottom edge, and wherein the perimeter frame does not provide generally vertical structural support of the upper portion.

10. The modular panel partition system of claim 5, further including a panel connector, the panel connector having an elongated, one piece body perimeter, having a first side that is adapted to releasably couple with either of the first edge or the opposing second edge of a first one of the number of panels, having a second side that is adapted to releasably couple with either of the first edge or the opposing second edge of a second one of the number of panels, and having an aperture that extends through each of the first and second sides of the panel connector, the aperture being aligned with the wire-way and being adapted to pass conduits through the aperture, between the panels, the panel connector being interposed between the first edge of the first panel and the second edge of the second panel in abutting engagement to connect the first and the second panels, the one piece body extending from the bottom edge of the first and second panels to the top edge of the first and second panels.

11. The modular panel partition system of claim 10, wherein the panel connector has a bottom end at the bottom edge of the first and the second panels, and wherein the aperture extends through the bottom end.

12. The modular panel partition system of claim 10, wherein the post has a hollow portion and is adapted to pass conduits through the hollow portion.

13. The modular panel partition system of claim 10, wherein the panel connector has a third side that is adapted to releasably couple with either of the first edge or the opposing second edge of a third one of the number of panels.

14. The modular panel partition system of claim 13, wherein the panel connector has a fourth side that is adapted to releasably couple with either of the first edge or the opposing second edge of a fourth one of the number of panels.

* * * * *